United States Patent
Miyamoto

(10) Patent No.: US 7,045,698 B2
(45) Date of Patent: May 16, 2006

(54) MUSIC PERFORMANCE DATA PROCESSING METHOD AND APPARATUS ADAPTED TO CONTROL A DISPLAY

(75) Inventor: Hiromu Miyamoto, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 183 days.

(21) Appl. No.: 10/351,062

(22) Filed: Jan. 23, 2003

(65) Prior Publication Data
US 2003/0110923 A1 Jun. 19, 2003

Related U.S. Application Data

(62) Division of application No. 09/654,386, filed on Sep. 1, 2000, now Pat. No. 6,541,687.

(30) Foreign Application Priority Data
Sep. 6, 1999 (JP) .................................. 11-251844

(51) Int. Cl.
*G09B 15/02* (2006.01)
(52) U.S. Cl. .................. 84/477 R; 84/600; 84/609; 84/615
(58) Field of Classification Search .......... 84/600–602, 84/609–610, 615, 649–650, 653, 477 R
See application file for complete search history.

(56) References Cited

U.S. PATENT DOCUMENTS

| | | | | |
|---|---|---|---|---|
| 5,585,585 | A | * 12/1996 | Paulson et al. | 84/610 |
| 6,066,792 | A | * 5/2000 | Sone | 84/609 |
| 6,121,533 | A | * 9/2000 | Kay | 84/616 |
| 6,188,010 | B1 | 2/2001 | Iwamura | |
| 6,201,174 | B1 | 3/2001 | Eller | |
| 6,204,441 | B1 | 3/2001 | Asahi et al. | |

FOREIGN PATENT DOCUMENTS

| | | |
|---|---|---|
| JP | 60-134294 | 7/1985 |
| JP | 60-192994 | 10/1985 |

OTHER PUBLICATIONS

Musicator for S-MPU Instruction Manual, p. 128, issued on Jan. 24, 1994, Japan, Roland Corporation.
CAKEWALK Pro Audio & Professional Version 6.0 Reference Manual, p. 323-324, issued on Nov. 14, 1997, Japan, Roland Corporation.
Musicator for S-MPU Instrument Manual, pp. 27 and 84, issued Jan. 24, 1994 in Japan by Roland Kabushikikaisha.

\* cited by examiner

*Primary Examiner*—Marlon Fletcher
(74) *Attorney, Agent, or Firm*—Morrison & Foerster LLP

(57) ABSTRACT

Performance data processing apparatus includes a memory for storing settings input by a user and a processor for performing various control in accordance with the settings stored in the memory. Performance data are displayed in one or more display forms desired by the user. Marker or repeat mark is displayed in response to an instruction for displaying the marker or repeat mark. The performance data are reproduced in accordance with the input mark indicating that a performance should be repeated within a predetermined range. Further, a chord name is converted in accordance with a designated type of transposing instrument, and the converted chord name is displayed or stored in memory. Because the various control is performed in accordance with the memory-stored user settings, the user is allowed to change convenience-of-use or operability of the performance data processing apparatus in creating/editing of the performance data, by just changing the settings.

16 Claims, 10 Drawing Sheets

[BOTH ON]

[ONLY REPEAT MARK ON]

[ONLY MARKER ON]

[BOTH ON (OTHER EXAMPLE)]

MUSIC PERFORMANCE DATA PROCESSING METHOD AND APPARATUS ADAPTED TO CONTROL A DISPLAY

This application is a division of application Ser. No. 09/654,386, filed on Sep. 1, 2000 now U.S. Pat. No. 6,541,687.

BACKGROUND OF THE INVENTION

The present invention relates generally to automatic performance apparatus, such as sequencers, automatic accompaniment apparatus and automatic rhythm performance apparatus, and more particularly to an improved music performance data processing method and apparatus which are arranged to control a visual display that can be used easily by a user in creating/editing performance data.

Hitherto, sequencer-type automatic performance apparatus have been known which store performance data (performance information) input via an electronic musical instrument's keyboard, computer and the like. With such automatic performance apparatus, a user can not only freely create performance data of desired performance tones but also freely edit stored performance data as desired. That is, these automatic performance apparatus are equipped with various functions that allow the user to readily make and edit the performance data. Among these functions are one for window-displaying a performance data editing screen in a predetermined format or form so that the user is to enter performance data and arrange and edit the performance data with a high degree of flexibility. Examples of the window-displayed performance data editing screen include: a track view window via which the user is allowed to create a music piece by sequentially pasting block data (each block data comprises performance data of a predetermined unit of a music piece such as a measure) at optionally-selected points of the measures or beats for each of tracks displayed on the screen; a staff window via which the user is allowed to enter performance data by just pasting notes, symbols etc. onto a musical score (e.g., a staff); a list window via which the user is allowed to finely enter performance data, such as tone pitch data, of each note in a numerical value; a piano roll window via which the user is allowed to enter performance data by graphically editing key depression timing and duration or time length of each key depression on a piano or other keyboard instrument; and a drum window via which the user is allowed to enter performance data only for a rhythm part. Each user can cause a plurality of performance data editing screens to be window-displayed simultaneously so that creation/editing of the performance data can be performed easily through these window-displayed performance data editing screens; thus, a wide variety of users, from only beginners to power users, can create full-scale music pieces in a smooth manner. Operations such as for displaying and entering the performance data via the performance data editing screens are being performed by performance data processing apparatus.

In creating performance data or editing desired existing performance data, the conventionally-known performance data processing apparatus always window-display, as an initial screen, a performance data editing screen of a fixed form (e.g., in the form of a track view window). Some users, however, want to or have to use, as the initial screen, a different performance data editing screen than the screen of the fixed form (e.g., a staff track view window or piano roll window); even in these cases, the conventional apparatus can only window-display the performance data editing screen of the fixed form as the initial screen. Therefore, whenever an initial performance data editing screen of a user desired form is to be displayed, the user has to input predetermined commands to the apparatus through cumbersome inputting operations.

Further, in creating performance data or editing desired existing performance data, each user can set and input one or more pointers or markers for indicating desired locations of window-displayed performance data, and predetermined repeat marks each for instructing a repetitive performance of a particular tone, tone type or measure in the performance data. However, if the marker and repeat mark are set and input to a same location of the performance data in an overlapping fashion, only one of the marker and repeat mark would be actually displayed at that location. Such a display does not allow the user to clearly identify the settings and thus would present inconvenience in editing of the performance data. In addition, although the conventional performance data processing apparatus permit setting and inputting of a repeat mark (such as a mark of mere repeat, dal segno or da capo) instructing a repetitive performance of many measures, they do not permit setting and inputting of a repeat mark for instructing a repetitive performance of just one, two, three or four measures immediately preceding the repeat mark, or a repeat mark for instructing a repetitive performance of just one tone immediately preceding the repeat mark (hereinafter, such a repeat mark effective only for a relatively short performance range will be referred to as a "partial repeat mark").

Furthermore, some of the conventionally-known performance data processing apparatus are designed to display chord names of performance tones on the display screen when window-displaying the performance data editing screen. However, for this purpose, it has been conventional from the apparatus to display chord name data just as stored among the performance data; that is, the known performance data processing apparatus are never arranged to display the chord name data in correspondence with predetermined chord notation for a designated transposing instrument such as a wind instrument (e.g., trumpet, saxophone or the like), so that they provide a very poor convenience of use or operability to a user making a music piece for a transposing instrument and present significant inconvenience in performance data editing.

SUMMARY OF THE INVENTION

It is therefore an object of the present invention to provide a music performance data processing method and apparatus which, when music performance data are to be visually shown on a display, allow the performance data to be automatically displayed, by default, in a user-desired display form.

It is another object of the present invention to provide a music performance data processing method and apparatus which can perform display filter control as to whether a particular display item should be displayed or not. Namely, the present invention seeks to provide a music performance data processing method and apparatus which, when both a marker and a repeat mark are set and input to a same location of performance data, can prevent the marker and repeat mark from being displayed on a screen in an overlapping relation to each other and thereby afford such a display as to permit a user to edit performance data with ease. The present invention also seeks to provide a music performance data processing method and apparatus which allow a partial repeat mark to be set and input and also permit a performance corresponding to the input partial repeat mark.

It is still another object of the present invention to provide a music performance data processing method and apparatus which, when chord names of performance data are to be displayed, allow the chord names to be displayed and input after modifying the chord names in correspondence with predetermined chord notation for a designated transposing instrument such as a wind instrument.

In order to accomplish the above-mentioned objects, the present invention provides a music performance data processing method which comprises the steps of: setting one or more music-performance-data display forms, in response to selection by a user; storing, into a memory, information representing said one or more music-performance-data display forms set by said step of setting; and controlling a display device to automatically display music performance data in said one or more music-performance-data display forms on the basis of said information stored in said memory. The step of controlling may control the display device to automatically display, at a predetermined time point, a music-performance-data display screen in the one or more music-performance-data display forms on the basis of said information stored in the memory. The predetermined time point may be when a default window should be displayed on said display device. Thus, a screen of a user-desired display form can be set as the initial screen in such a manner that performance data are automatically displayed on the default window in the user-desired display form, through which the user is allowed to readily perform a desired operation, such as editing of the performance data, in an easy-to-use style.

The present invention also provides a music performance data processing method which comprises the steps of: setting whether or not a position mark indicative of a position of performance data and a repeat mark to be used for performing performance data repetitively over a predetermined range should be displayed on a music-performance-data display screen; storing, into a memory, information indicating whether or not the position mark and the repeat mark should be displayed, in accordance with setting by said step of setting; and controlling a display device to display the position mark and the repeat mark on said music-performance-data display screen, in accordance with said information stored in said memory.

With the above-mentioned arrangements, the user is allowed to freely make settings as to whether or not the marker or repeat mark should be displayed, and such settings are stored into the memory. In accordance with the stored settings, either one or both of the marker and repeat mark can be displayed, or neither of the marker and repeat mark can be displayed, just as desired by the user. By thus inputting the settings as to whether or not the marker or repeat mark should be displayed, only a mark or marks necessary for the user can be selectively displayed, which thereby achieves a performance data display that is very easy to view.

The present invention also provides a music performance data processing method which comprises the steps of: setting display filter parameters for controlling whether or not a particular display item should be shown on a music-performance-data display screen on a display device; and controlling said display device to not show the particular display item on the music-performance-data display screen in accordance with the display filter parameters set by said step of setting, when setting has been made to not show the particular display item. As an example, the particular display item includes at least first and second display items that are likely to be shown at a same location on the music-performance-data display screen, and the display filter parameters include data for performing control, separately for each of the first and second display items, as to whether or not the display item should be shown on the music-performance-data display screen.

The present invention also provides a music performance data processing method which comprises the steps of: inputting a repeat mark in correspondence with a desired performance location; and generating performance data, to be used for the performance location where the repeat mark has been input, in such a way as to repeat a predetermined unit of the performance data immediately preceding said performance location where the repeat mark has been input.

In the music performance data processing method thus arranged, inputting a repeat mark to a desired performance location can instruct a repetitive performance of a predetermined unit (e.g., a beat-constituting unit or measure-constituting unit) of performance data immediately preceding the desired performance location. Thus, using the repeat mark, the user is allowed to edit the performance data with great ease.

The present invention also provides a music performance data processing method which comprises the steps of: receiving data indicative of chord names in accordance with a chord progression in a music peice; designating a transposing instrument; and controlling the chord names indicated by the received data to be converted to other chord names to be displayed on a display device, in response to the transposing instrument designated by said step of designating.

When a transposing instrument is to be used, each chord name to be displayed in accordance with a chord progression in a music performance is automatically shifted or converted by a transposition amount corresponding to the automatically-designated transposing instrument, and the thus-shifted or converted chord name is displayed. With this arrangement, there can be obtained a consistency or correspondence between the displayed chord name and actual tone pitches of the transposing instrument to be used, so that even the user using the transposing instrument is allowed to readily edit the music performance data.

The present invention may be constructed and implemented not only as the above-mentioned method invention but also as an apparatus invention. The present invention may be implemented as any desired combination of the apparatus and method. Further, the present invention may be arranged and implemented as a program for execution by a processor such as a CPU or DSP, as well as a machine-readable storage medium storing such a program. Further, the processor may comprise a dedicated processor based on predetermined fixed hardware circuitry, rather than a CPU or the like capable of operating by software.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Figure 1:
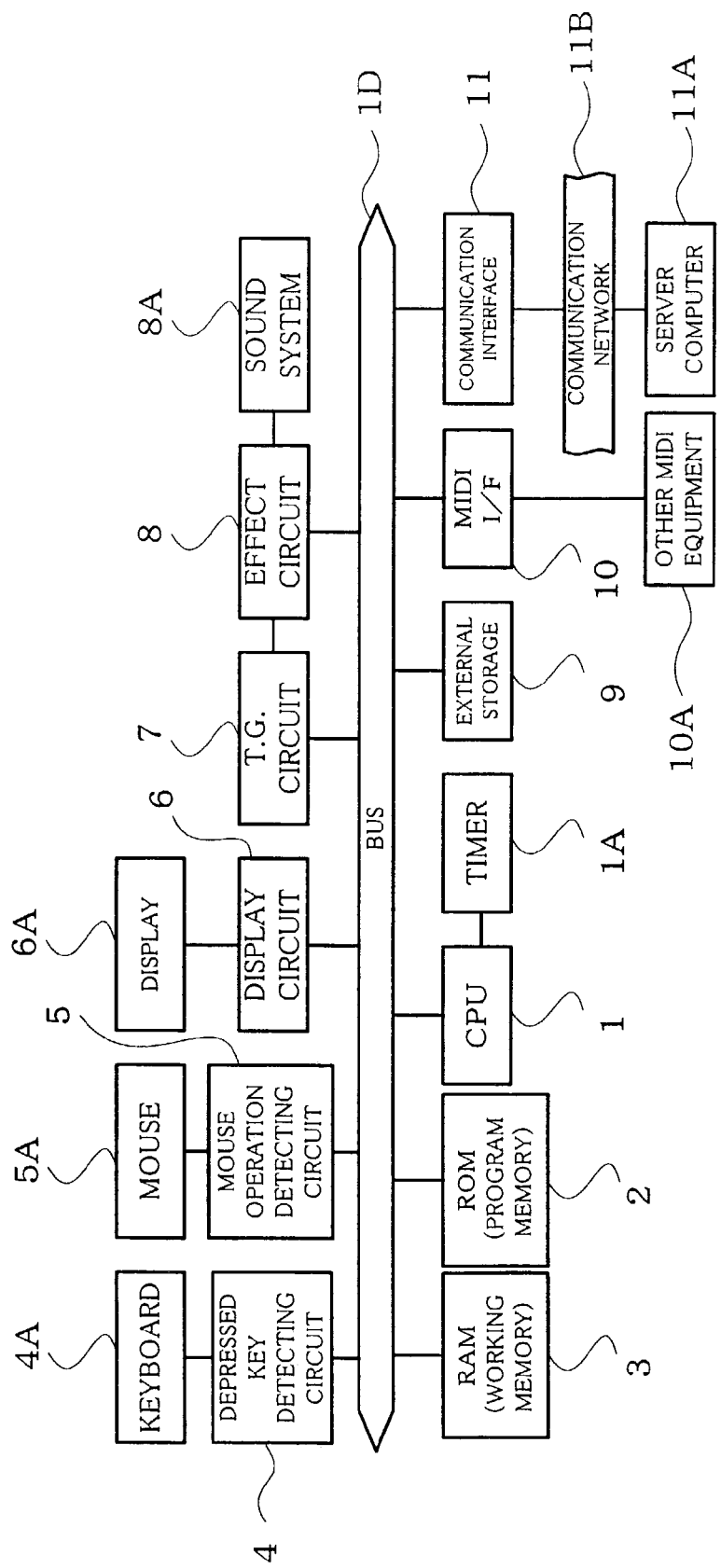
FIG. 1 is a block diagram illustrating an exemplary general hardware setup of an electronic musical instrument having incorporated therein a performance data processing apparatus in accordance with a preferred embodiment of the present invention.

FIG. 1 is a block diagram illustrating an exemplary general hardware setup of an electronic musical instrument having incorporated therein a performance data processing apparatus in accordance with a preferred embodiment of the present invention.

This electronic musical instrument is controlled by a microcomputer comprising a microprocessor unit (CPU) 1, a program memory 2 and a working memory 3. The CPU 1 controls operation of the entire electronic musical instrument. To the CPU 1 are connected, via a data and address bus 1D, the program memory 2, working memory 3, depressed key detecting circuit 4, mouse operation detecting circuit 5, display circuit 6, tone generator (T.G.) circuit 7, effect circuit 8, external storage device 9, MIDI interface (I/F) 10 and communication interface 11. Also connected to the CPU 1 is a timer 1A for counting various time periods, for example, to signal interrupt timing for a timer interrupt process.

The program memory 2, which is a read-only memory (ROM), has prestored therein various programs and various data. The working memory 3, which is intended to temporarily store various performance-related information and various data generated as the CPU 1 executes the programs, is allocated in predetermined address regions of a random access memory (RAM) and used as registers, flags, etc. Keyboard 4A includes a plurality of keys for designating a pitch of each tone to be generated by the electronic musical instrument and a plurality of key switches provided in corresponding relations to the keys. The keyboard 4A can be used not only for a tone performance but also as a means for inputting performance data. The depressed key detecting circuit 4 detects each key depression and release on the keyboard 4A, to output key-on event data and key-off event data. Note that the keyboard 4A may include various operators for inputting various musical conditions; for example, the keyboard 4A may include a ten-button keypad for entry of numeric value data and other operators, such as in the form of a switch panel, for selecting, setting and controlling a tone pitch, color, effect, etc. Mouse 5A is provided for pointing to a position of a music piece to be performed, visually shown on a display 6A, in order to enter various musical conditions pertaining to the music piece, or giving an instruction to perform a predetermined process (such as an operation for turning on/off a window display of a performance data editing screen to be shown on the display 6A or an operation for pasting block data or note onto the performance data editing screen). The mouse operation detecting circuit 5 constantly detects an operating state of the mouse 5A and supplies information representing the detected operating state of the mouse 5A to the CPU 1 via the data and address bus 1D. The display circuit 6 visually displays various information, such as controlling conditions of the CPU 1 and contents of performance data, on the display 6A that may comprise an LCD (Liquid Crystal Device) or CRT (Cathode Ray Tube).

The tone generator (T.G.) circuit 7, which is capable of simultaneously generating tone signals in a plurality of channels, receives performance information supplied via the data and address bus 1D and generates tone signals based on these received data. Each of the tone signals thus generated by the tone generator circuit 7 is audibly reproduced or sounded by a sound system 8A. The effect circuit 8 imparts various effects to the tone signals generated by the tone generator circuit 7. Any tone signal generation method may be used in the tone generator circuit 7, such as: the memory readout method where sound waveform sample value data stored in a waveform memory are sequentially read out in accordance with address data that vary in correspondence to the pitch of a tone to be generated; the FM method where sound waveform sample value data are obtained by performing predetermined frequency modulation operations using the above-mentioned address data as phase angle parameter data; or the AM method where sound waveform sample value data are obtained by performing predetermined amplitude modulation operations using the above-mentioned address data as phase angle parameter data. Further, the tone generator circuit 7 may be implemented by a combined use of a DSP and microprograms or of a CPU and software programs, rather than by use of dedicated hardware. The tone generation channels to simultaneously generate a plurality of tone signals in the tone generator circuit 7 may be implemented either by using a single circuit on a time-divisional basis or by providing a separate circuit for each of the channels.

The external storage device 9 is provided for storing performance data, such as performance data and performance-related data such as rhythm patterns, and data relating to control of the various programs for execution by the CPU 1. Where a control program is not prestored in the ROM 2, the control program may be prestored in the external storage device (e.g., hard disk device) 9, so that, by reading the control program from the external storage device 9 into the RAM 3, the CPU 1 is allowed to operate in exactly the same way as in the case where the control program is stored in the program memory 2. This arrangement greatly facilitates version upgrade of the control program, addition of a new control program, etc. The external storage device 9 may use any of various removable-type media other than the hard disk (HD), such as a floppy disk (FD), compact disk (CD-ROM or CD-RAM), magneto-optical disk (MO) or digital versatile disk (DVD).

The MIDI interface (I/F) 10 is provided for receiving or delivering MIDI performance information from or to other MIDI equipment 10A or the like outside the electronic musical instrument. Further, the communication interface 11 is connected to a communication network 11B, such as a LAN (Local Area Network), the Internet or telephone lines, via which it may be connected to a desired sever computer 11A so as to input a control program and various data to the electronic musical instrument. Thus, in a situation where the control program and various data are not contained in the ROM 2 or hard disk, these control program and data can be downloaded from the server computer 11A. In such a case, the electronic musical instrument, which is a "client", sends a command to request the server computer 11A to download the control program and various data by way of the communication interface 11 and communication network 11B. In response to the command from the client, the server computer 11A delivers the requested control program and data to the electronic musical instrument via the communication network 11B. The electronic musical instrument receives the control program and data via the communication interface 11 and accumulatively store them into the hard disk. In this way, the necessary downloading of the control program and various data is completed. Note that the MIDI interface 10 may be a general-purpose interface rather than a dedicated MIDI interface, such as RS232-C, USB (Universal Serial Bus) or IEEE1394, in which case other data than MIDI messages may be communicated at the same time.

Figure 2:
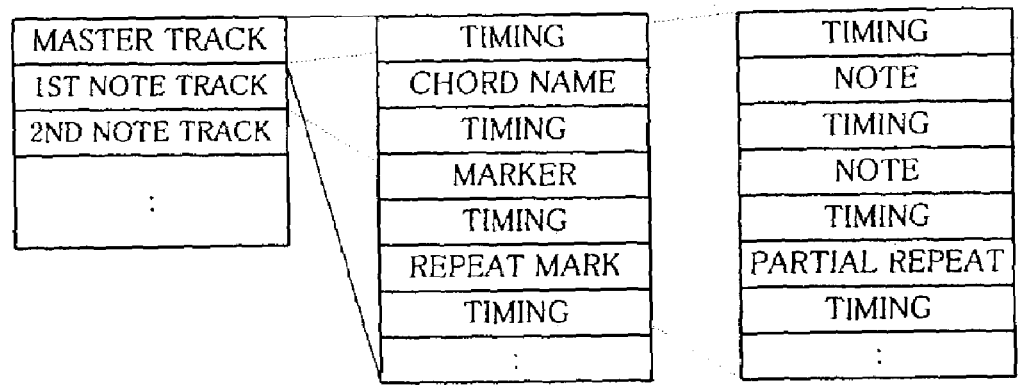
FIG. 2 is a block diagram conceptually showing an exemplary organization of performance data employed in the embodiment of the present invention.

FIG. 2 is a block diagram conceptually showing an exemplary organization of performance data employed in the preferred embodiment of the present invention. In accordance with the performance data, the performance data processing apparatus visually shows a musical score on the display 6A or reproduces a performance, as will be later described in detail in relation to performance processing of FIG. 4.

The performance data can be generally classified into one set of master track data and a plurality of sets of note track data. The master track data set includes, for example, data pertaining to timing, chord name, marker (position mark), repeat mark, etc., which are used among all the note track data sets. The chord name data is data to be used for display of a chord name or designation of a chord for an automatic accompaniment. The marker data (position mark) is data to be used for causing the pointer of the mouse 5A or the like to a desired location at the time of data entry. The repeat mark data is data to be used for controlling repetition of the entire note track data set. Each of the note track data set includes data to be used exclusively for the track in question, such as note data and partial repeat mark. The note data is data to be used for audible sounding or deadening (silencing) of a tone. The partial repeat mark data is data to be used for repeating one or more note data immediately preceding the partial repeat mark in the track. The master track data and note track data sets each includes combinations of data indicative of generation timing of the data and data indicative of type or content of the data (e.g., chord name identification data and chord name data). The other data also include combinations of identification data and data indicative of its substance. For example, in the illustrated example, the timing data is recorded as a relative time value measured from the preceding data, although it may be recorded as an absolute time value measured from the beginning of the music piece or measure. Namely, the performance data may be in any desired format, such as: the "event plus absolute time" format where the time of occurrence of each performance event is represented by an absolute time within the music piece or a measure thereof; the "event plus relative time" format where the time of occurrence of each performance event is represented by a time length from the immediately preceding event; the "pitch (rest) plus note length" format where each performance data is represented by a pitch and length of a note or a rest and length of the rest; or the "solid" format where a memory region is reserved for each minimum resolution of a performance and each performance event is stored in one of the memory regions that corresponds to the time of occurrence of the performance event. Namely, the timing data is data representing a location where a chord name, marker, repeat mark or the like is to be shown on the display screen, or tone generating timing in a music performance. It should be appreciated that the master track data set may include, in addition to the above-mentioned, other performance parameters pertaining to the entire music piece, such as tone color, tempo and musical time.

The performance data employed in the present invention should not be construed as being limited to the example of FIG. 2 where the master track data set and individual note track data sets are stored in successive storage regions; instead, they may be stored dispersedly in non-successive storage regions. For example, the master track data set and individual note track data sets may be stored in separate memories, in which case, however, it is of course necessary to manage the dispersed data as successive data. As an example, there may be provided a look-up table showing the corresponding relation between the mater track data set and the note track data sets so that performance data can be determined by reference to the table.

Further, the individual note track data may be stored mixedly in a single track, in which case it is only necessary to impart track identification data to each event.

Figure 3:
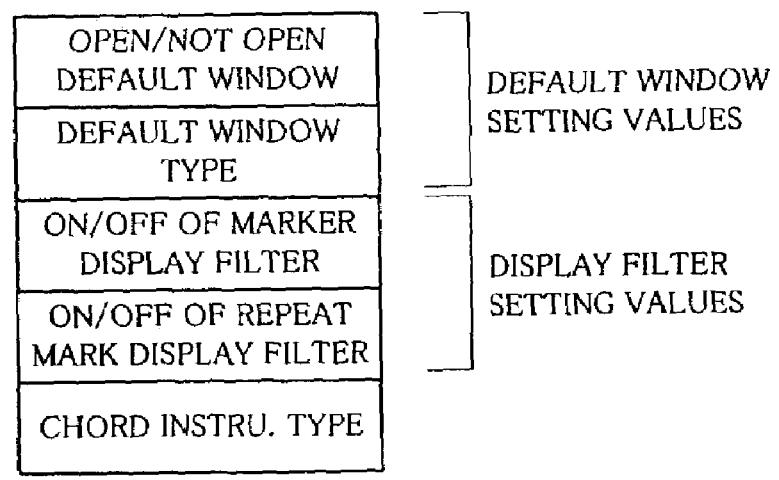
FIG. 3 is a diagram conceptually showing an example of a data storage format in a register for storing various setting values that are used in the embodiment of the present invention.

FIG. 3 is a diagram conceptually showing an example of a data storage format in a setting value register for storing various setting values that are used in the preferred embodiment of the present invention.

The setting value register is provided for storing various setting values entered by the user via the display using the keyboard and mouse. In the illustrated example, the setting value register includes regions for storing default window setting values, display filter setting values and chord instrument type. The default window setting values include a value of setting information indicating whether or not a user-desired window should be opened by default (hereinafter referred to as a "user-desired default window"); for example, this setting information is set to a value "1" when the user-desired default window is to be opened but set to a value "0" when the user-desired default window is to not be opened. The default window setting values also include a value indicative of a specific type of the user-desired default window such as a list window or piano roll window. A plurality of types of windows can be set as the user-desired default window in the instant embodiment, and all or part of the thus-set user-desired default windows are opened in accordance with the setting information. The display filter setting values include values of marker display on/off information and repeat mark display on/off information. The marker display on/off information is information for determining whether or not a particular marker should be displayed on a window-displayed screen; for example, the marker display on/off information is set to a value "1" when the marker should be displayed but set to a value "0" when the marker should not be displayed. Further, the repeat mark display on/off information is information for determining whether or not a particular repeat mark should be displayed on a window-displayed screen; for example, the repeat mark display on/off information is set to a value "1" when the repeat mark should be displayed but set to a value "0" when the repeat mark should not be displayed. The marker display on/off information and repeat mark display on/off information each functions as a so-called display filter, by causing a particular display item to be displayed or not displayed in accordance with the setting of the on/off information.

As the chord instrument type data, there are recorded a particular type of a musical instrument and a fundamental (in "tuning" menu item to be described later). For example, "normal instrument" is recorded in the case of an instrument like piano whose fundamental (i.e., a key note in original tuning) is "C", and "transposing instrument" is recorded in the case of an instrument like trumpet or saxophone whose fundamental is other than "C" (e.g., the fundamental of trumpet is "Bb" and the fundamental of alto saxophone is "Eb")—here, "b" represents the flat (♭) symbol. Of course, the present invention is not so limited, and the name of each individual musical instrument may be recorded. In the case of a transposing instrument, its fundamental is recorded in the "tuning" menu item; for example, "Bb" is recorded for trumpet, and "Eb" is recorded for alto saxophone. If the type is "normal instrument", fundamental "C" may or may not be recorded in the "tuning" menu item.

Note that only one setting value register may be shared for all sorts of the performance data or a plurality of such setting value registers may be provided in corresponding relation to different sorts of the performance data. In an alternative, only selected one or more of the various setting values may be shared for all sorts of the performance data, while the remaining setting values may be provided for (e.g., stored in) different sorts of the performance data on a one-to-one basis. For example, only the chord instrument type may be provided for each sort of the performance data. Further, the setting value register or registers may store other data than the above-mentioned.

Figure 4:
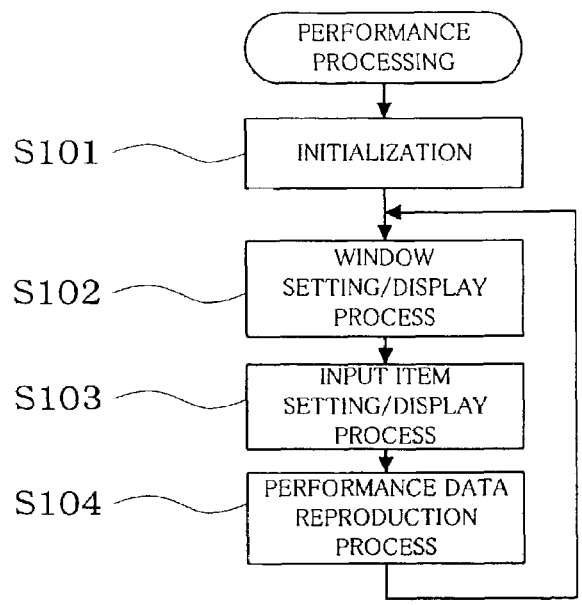
FIG. 4 is a flow chart showing an exemplary operational sequence of performance processing carried out by the performance data processing apparatus.

FIG. 4 is a flow chart showing an exemplary operational sequence of the performance processing carried out by the performance data processing apparatus in accordance with the preferred embodiment of the invention, and FIGS. 5–8 are flow charts illustrating details of various processes shown in FIG. 4.

The performance processing is started in response to a predetermined operation such as turning-on of the power supply. First, at step S101, an initialization process is carried out for placing the performance data processing apparatus in predetermined initial condition. At step S102, a window setting/display process is executed for setting performance data that are to be displayed on a window. At next step S103, an input item setting/display process is executed in response to an input operation by the user. At following step S104, a reproduction process is executed for reproducing a tone based on the performance data. After completion of the reproduction process, the performance processing loops back to step S101 to repeat the above-mentioned operations.

The following paragraphs describe in greater detail the above-mentioned processes, with reference to the flow charts of FIGS. 5–8.

Figure 5:
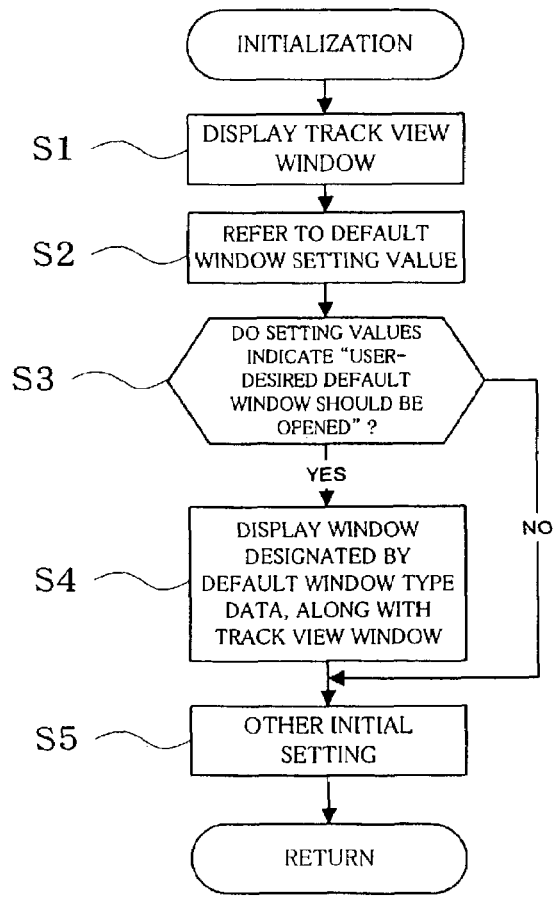
FIG. 5 is a flow chart of an initialization process carried out by the performance data processing apparatus.

FIG. 5 is a flow chart showing an exemplary operational sequence of the initialization process at step S101 of FIG. 4. At step S1 of FIG. 5, a track view window, displayed as an initial screen in the instant embodiment, is a window via which the user is allowed to create a music piece by sequentially pasting block data (each block data comprising performance data of a predetermined unit such as a measure) onto optionally-selected points of each measure or beat for each track displayed on the screen (see, for example, FIG. 9 or 10). As seen from FIG. 9 or 10, the track view window in the instant embodiment has, in a upper portion of the initial screen, process selection fields, such as "file", "window" and "setting", so that a desired process can be selectively carried out by the user selecting a corresponding one of the process selection fields via the mouse 5A or the like. In middle and lower portions of the screen, there are provided data fields for visually showing or allowing entry of performance data; that is, block data and chord name can be input to or displayed in the middle and lower portions, respectively. Since such a track view window is conventionally known and generally used today, it will not be described any further here.

It should be appreciated that the displayed items and form or format of the track view window are not limited to the above-mentioned and the track view window may includes any other fields than the above-mentioned fields. Also, the fields may be displayed at any desired positions in the track view window.

Referring back to FIG. 5, reference is made to the default window setting values currently stored in the setting value register at step S2, in order to determine whether or not there is any other window (i.e., user-desired default window) to be initially displayed together with the track view window. If the default window setting values referred to at step S2 indicate "no user-desired default window should be opened" (NO determination at step S3), then the initialization process jumps to step S5 since there is no need to open any user-desired default window as the initial screen. If, on the other hand, the default window setting values referred to at step S2 indicate "a user-desired default window should be opened" (YES determination at step S3), then a user-desired default window as designated by the "default window type" data is displayed as the initial screen simultaneously with the track view window at step S4. For example, if the default window setting values indicate "a user-desired default window should be opened" and the desired default window type is a staff window, then both of the track view window and the staff window are simultaneously shown on the display 6A in an overlapping or side-by-side relation to each other. At following step S5, other initial setting operations are performed as necessary, such as those for the tone generator.

In the above-mentioned manner, a window of any user-desired form can be automatically displayed, by default, on startup of the initialization process, which thereby eliminates a need for the user to separately enter commands for causing a window of a user-desired form to be displayed as the initial screen. As a consequence, the inventive performance data processing apparatus achieves enhanced convenience of use or operability.

Whereas the preferred embodiment has been described above as opening a new user-desired default window at the time of the initial setting, the operation for opening a user-desired default window may be executed in response to an instruction for creating performance data of a music piece given by the user at any desired time point (i.e., when the user newly creates desired music performance data) or when an existing performance data file is to be opened. Further, separate default window setting information may be stored for each performance data file in such a manner that a window of a different form can be opened for each performance data file. In an alternative, different or separate default window setting information may be set and stored for each of plural users in such a manner that a window of a specific form corresponding to a specific user can be opened when the specific user use the performance data processing apparatus or cause the performance data processing program to start. For example, a window of a specific form corresponding to a specific user can be opened in response to entry of the user's name on startup of the performance data processing apparatus or program. Furthermore, although the instant embodiment has been described above as separately setting the open/non-open condition and type of a user-desired default window, any desired option for simultaneously setting the open/non-open condition and type of a user-desired default window may be taken from among various such options, for example, of "opening a staff window", "opening a piano roll window", "opening a list window", "opening a drum window", "not opening a user-desired default window", etc. Furthermore, such setting may be made as to simultaneously open a plurality of windows, in which case these windows may be displayed in separate regions.

Figure 6:
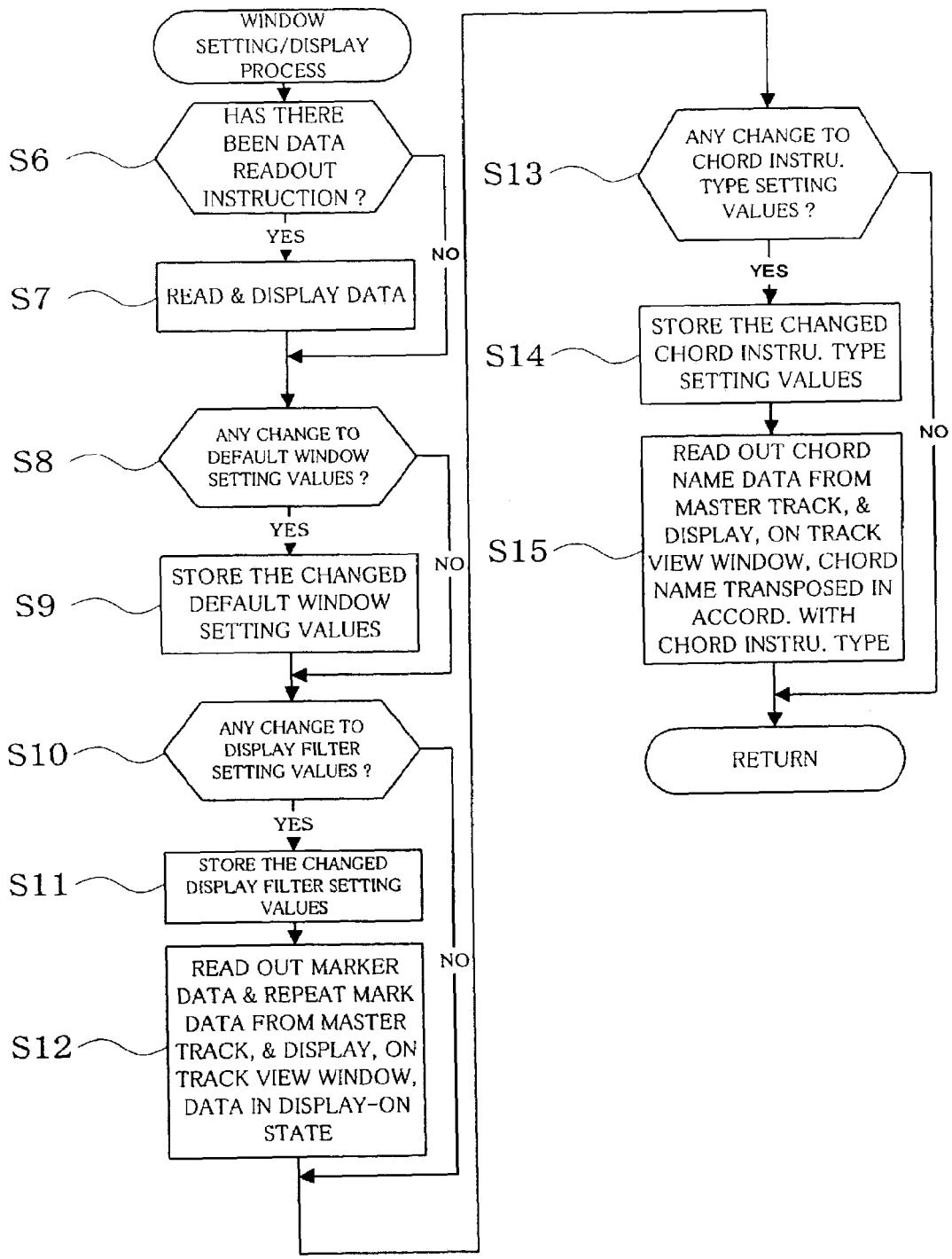
FIG. 6 is a flow chart showing an exemplary operational sequence of a window setting/display process shown in FIG. 4.

FIG. 6 is a flow chart showing an exemplary operational sequence of the window setting/display process at step S102 of FIG. 4. At step S6, a determination is made as to whether or not an instruction has been given for reading out specific performance data to be edited. If answered in the affirmative at step S6, the performance data is read out from the external storage device 9 or the like into the RAM 3 and contents of the performance data are displayed at step S7 in the track view window and user-desired default window displayed through the above-described initialization process of FIG. 5. If, on the other hand, no instruction has been given for reading out specific performance data for creation of new performance data as determined at step S6, the window setting/display process jumps over step S7 to step S8. At step S8, it is determined whether any change has been made to the default window setting values in the setting value register, i.e. whether any change has been made to the settings of the user-desired default window displayed through the initialization process. If answered in the affirmative at step S8, the setting value register is updated with the changed default window setting values at step S9. If, on the other hand, no change has been made to the default window setting values as determined at step S8, the window setting/display process jumps to step S10.

Figure 9:
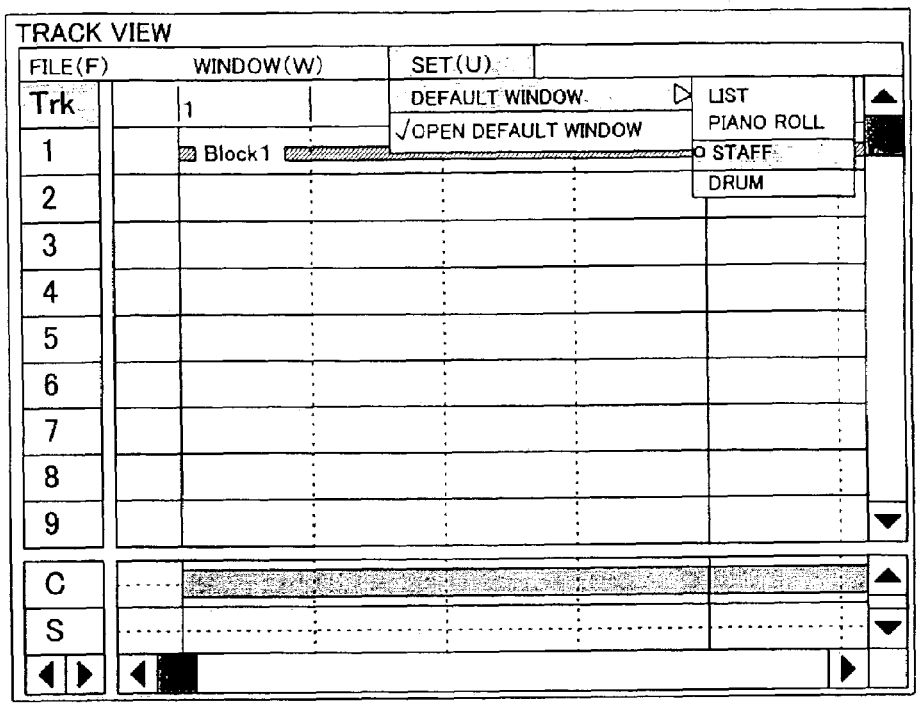
FIG. 9 is a diagram showing an exemplary screen display when a change is made to default window setting values.

FIG. 9 is a diagram showing an exemplary screen display when a change is made to the default window setting values. Namely, in response to a user operation via the mouse 5A, a pop-up menu is opened, which includes menu items of "default window" and "open default window" and where the "default window" has submenu items of "list", "piano roll", "staff" and "drum". The "default window" item is provided for the user to select one of user-desired default windows that is to be displayed as the initial screen; in the illustrated example, the "staff" window has been selected. The "open default window" item is provided for the user to make a selection as to whether or not any user-desired default window is opened as the initial screen. When a user-desired default window is to be opened, a check mark is added to the left end of the "open default window" item, but when no user-desired default window is to be opened, the check mark at the left end of the item is deleted. Namely, FIG. 9 shows a situation where setting has been made to cause the track view window and staff window to be simultaneously displayed as the initial screen.

Referring back to FIG. 6, it is determined at step S10 whether or not any change has been made to the display filter setting values. If answered in the affirmative at step S10, the changed display filter setting values are stored into the register at step S11. Then, at step S12, marker data and repeat mark data are read out from among the marker track data, of which the data currently placed in the display-on state is displayed on the track view window. In case both of the read-out marker data and repeat mark data are in the display-off state, neither of the data is displayed on the track view window.

Figure 10:
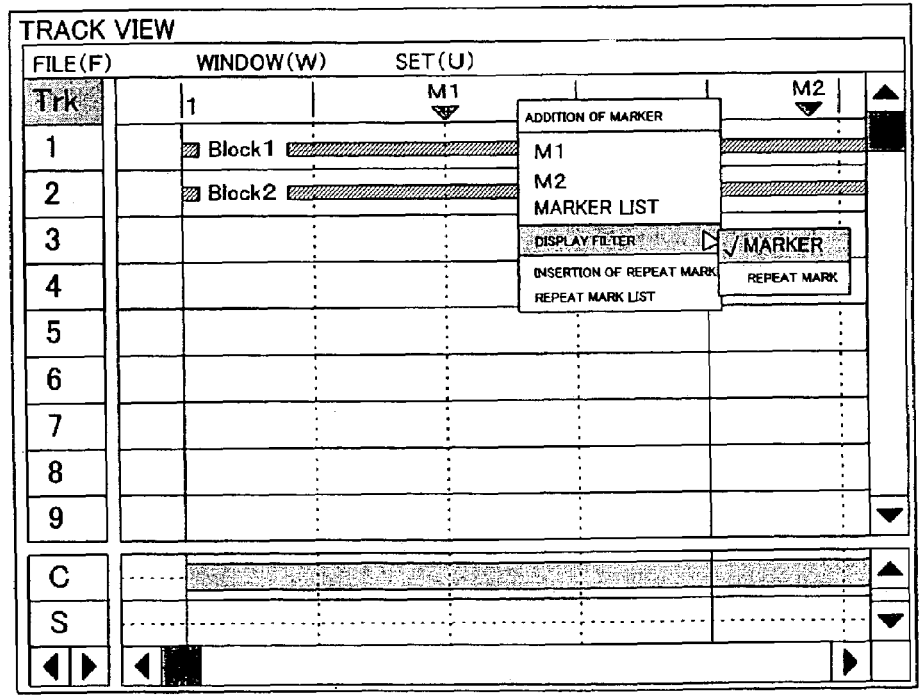
FIG. 10 is a diagram showing an exemplary screen display when a change is made to display filter setting values.

FIG. 10 is a diagram showing an exemplary screen display when a change is made to the display filter setting values. Unlike in the case where a change is made to the default window setting values, the instant embodiment in this situation newly window-displays a pop-up menu, irrespective of the field selection via the track view window, so that the user is allowed to select one of the display filters from the pop-up menu. The pop-up menu includes menu items of "addition of marker", "marker name" (M1 and M2), "marker list", "display filter", "insertion of repeat mark" and "repeat mark list". The "display filter" menu item includes submenu items of "marker" and "repeat mark". The "addition of marker" menu item is provided for adding a new marker. The "marker name" (M1 and M2) and "marker list" menu items indicate currently-set markers, and selecting M1 or M2 displayed as the "marker name" causes the pointer or the like to jump to the position of the selected marker. The "marker list" menu item is provided for displaying a listing of currently-registered markers, as well as a window where addition, positional change or deletion of a marker is possible. The "display filter" menu item is provided for setting a mark (marker or repeat mark) to be displayed on the screen; in the instant embodiment, the desired mark can be displayed by causing a check mark to be shown at the left end of the "marker" or "repeat mark" item. Namely, in the illustrated example of FIG. 10, only the marker (M1 or M2) is displayed. The "repeat mark insertion" menu item is provided for being used to add a new repeat mark. The "repeat mark list" menu item is provided for displaying a listing of currently-set repeat marks, as well as a window where positional change or deletion of a repeat mark is possible.

Again referring back to FIG. 6, if no change has been made to the display filter setting values as determined at step S10, the window setting/display process jumps to step S13 without changing the position or the like of the marker or repeat mark displayed on the track view window. At step S13, it is determined whether or not any change has been made to the chord instrument type setting values. If the chord instrument type setting values have been changed as determined at step S13, the changed chord instrument type setting values are stored into the register at step S14. Then, at following step S15, chord name data is read out from among the marker track data, and a chord name shifted or transposed in accordance with the chord instrument type is displayed on the track view window. If, on the other hand, the chord instrument type setting values have not been changed (No determination at step S13), the window setting/display process is brought to an end; that is, the window setting/display process is switched to another process without changing the chord name displayed on the track view window.

Figure 11:
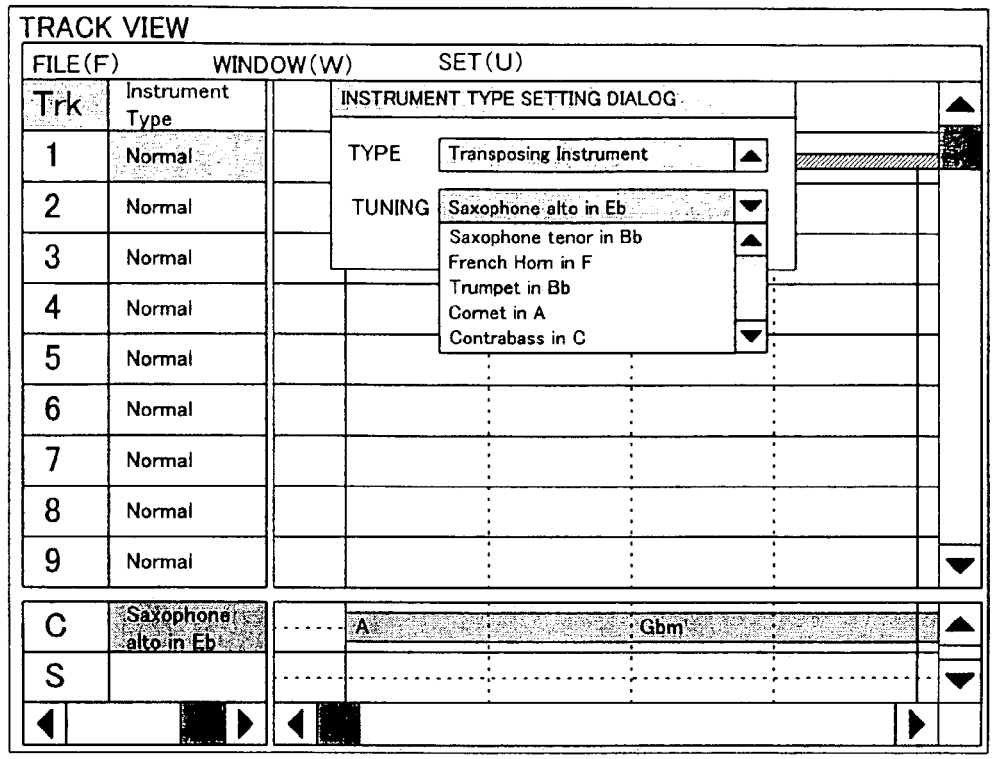
FIG. 11 is a diagram showing an exemplary screen display when a change is made to chord instrument type setting values.

FIG. 11 is a diagram showing an exemplary screen display when a change is made to the chord instrument type setting values. In the instant embodiment, selecting a instrument type data field of a particular track causes a new dialog window (instrument type setting dialog window) to be displayed, so that the user is allowed to set a desired chord instrument type via this dialog window. The instrument type setting dialog window includes menu items of "type" and "tuning". The "type" menu item is provided for the user to select a desired instrument type from "normal instrument" and "transposing instrument". The "tuning" menu item is provided for the user, when the "transposing instrument" item has been selected, to select a specific type of transposing instrument, such as soprano saxophone, alto saxophone or French horn, to thereby determine a fundamental (i.e., tuning or a key note in original tuning). In the instant embodiment, the user can select and set any one of options each comprising a combination of an instrument name and fundamental. In the illustrated example of FIG. 11, alto saxophone has been selected in the "tuning" menu item and thus the fundamental (tuning) is set to "Eb".

Here, the chord name display changing operation at step S15 is explained briefly. As already stated, the transposing instrument means a musical instrument whose fundamental is other than "C". For trumpet, "Bb" is generally the fundamental, so that the C major scale in this case becomes the Bb major scale in actual tone pitches. Therefore, a score for the trumpet part must be prepared with all notes transposed upward by a whole step (major second). However, in the chord name data of the master track data, there is recorded a chord name in the C major scale which, if directly displayed in the track view window as a chord of the transposing instrument, would become an indication that is very difficult for the user to identify. This is the reason why the chord name data is first transposed in accordance with the fundamental recorded in the "tuning" menu item and then the resultant transposed chord name is displayed on the track view window as a chord fitting the transposing instrument.

Whereas the embodiment has been described above as displaying the marker and repeat mark on the track view window, the marker and repeat mark may be displayed on a window of any other form, such as the staff window or piano roll window. Further, although the embodiment has been described above as being capable of separately or independently setting the on/off state of the display filter for each of the marker and repeat mark, any desired option may be set from among a plurality of options differing in the on/off combination, such as "display the marker alone", "display the repeat mark alone", "display both the marker and the repeat mark" and "display neither of the marker and repeat mark".

Furthermore, whereas the embodiment has been described above in relation to the case where a desired chord instrument type is determined by selecting any one of options each comprising a combination of an instrument name and fundamental in the "tuning" menu item, a desired instrument name and fundamental (tuning) may be set independently of each other rather than in combination. In addition, icons having general shapes of corresponding musical instruments may be displayed in place of, or in addition to, the instrument names so that any desired fundamental can be selected and set easily by use of the thus-displayed instrument icons.

Figure 7:
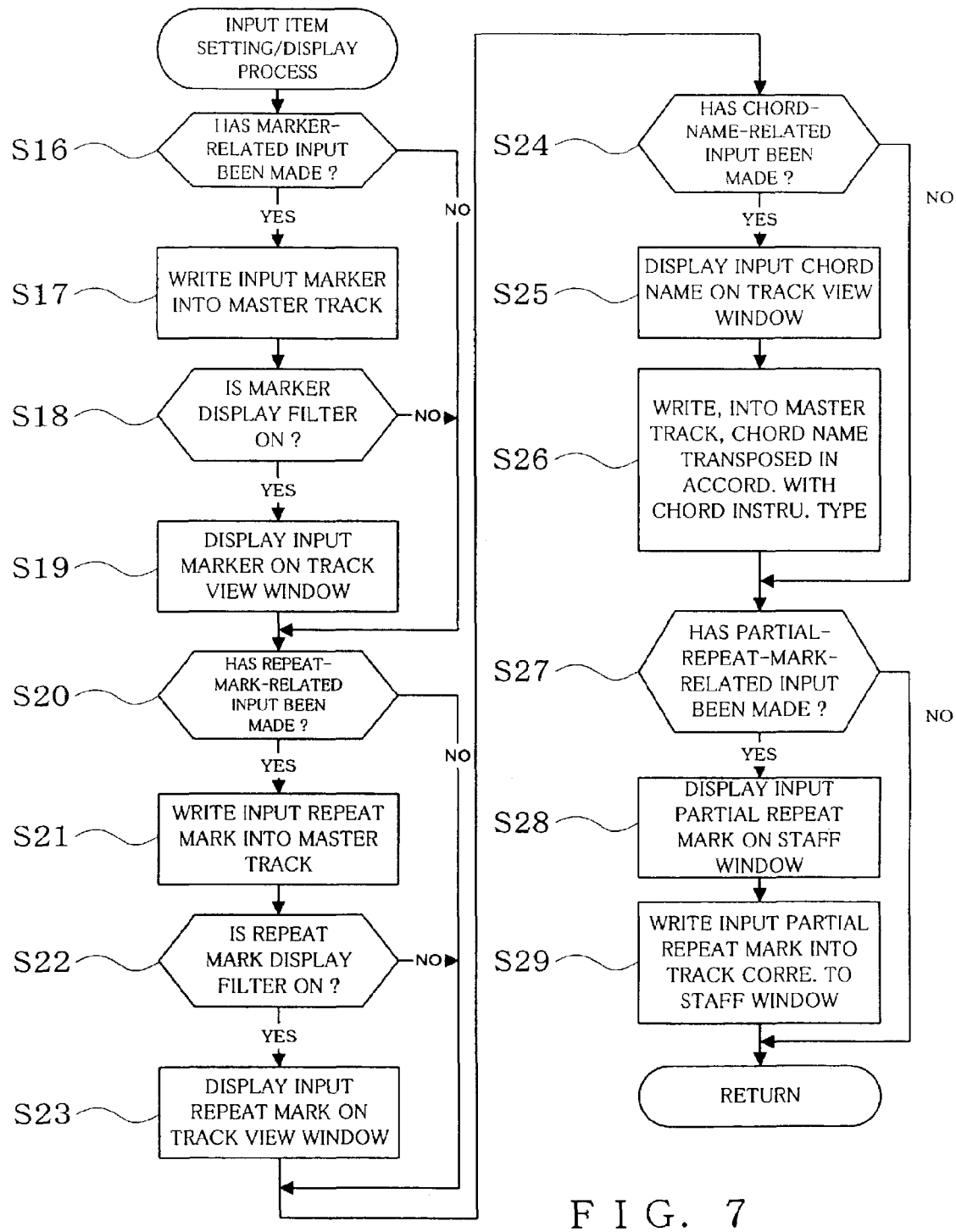
FIG. 7 is a flow chart showing an exemplary operational sequence of an input item setting/display process shown in FIG. 4.

FIG. 7 is a flow chart showing an exemplary operational sequence of the input item setting/display process at step S103 of FIG. 4. At step S16, it is determined whether marker-related input has been made, i.e., whether addition of a marker, positional change or deletion of the existing marker or the like has been made by the user. If such marker-related input has been made as determined at step S16, the input marker is written into the master track data (or the marker is deleted if the input so indicates) at step S17. If the marker display filter is in the ON state at this time as determined at step S18, the currently-set marker is displayed on the track view window at step S19. If no marker-related input has been made (No determination at step S16), the input item setting/display process jumps to step S20 without performing the operations of steps S17–S19.

At step S20, it is determined whether repeat-mark-related input (addition of a new repeat mark, positional change or deletion of the existing repeat mark or the like) has been made or not. If no repeat-mark-related input has been made as determined at step S20, the input item setting/display process jumps to step S24. If, however, such repeat-mark-related input has been made (YES determination at step S20), the input repeat mark is written into the master track data (or the repeat mark is deleted if the input so indicates) at step S21. Then, a further determination is made at step S22 as to whether the repeat mark display filter is currently in the ON state. If answered in the affirmative at step S22, the input repeat mark is displayed on the track view window at step S23. If, however, the repeat mark display filter is not currently in the ON state as determined at step S22, the input item setting/display process jumps to step S24.

Figure 12:
FIG. 12 is a diagram conceptually showing an exemplary manner in which a marker and repeat mark are displayed.
Figure 12:
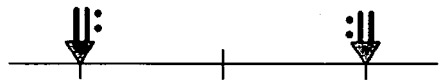
Figure 12:
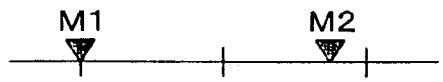
Figure 12:

Here, a brief description will be given about an exemplary manner in which the marker and repeat mark are displayed when the marker and repeat mark have been set at a same location or closely adjoining locations of the performance data. FIG. 12 is a diagram conceptually showing the exemplary manner in which the marker and repeat mark are displayed, and more particularly showing, on magnified scale, only positions in the track view window where the marker and repeat mark can be displayed.

As seen from FIG. 12, when the marker and repeat mark have been set at a same location or closely adjoining locations of the performance data and if the setting values of both the marker display filter and repeat mark display filter are set to the ON state, the marker and repeat mark would be displayed in an overlapping manner and thus very difficult for the user to visually identify. Therefore, in the instant embodiment, the display filter parameters are set to display just either one, not both, of the repeat mark and marker; this arrangement can avoid the marker and repeat mark from being displayed in an overlapping manner and thereby allows the user to visually identify the repeat mark or marker with great facility.

It should also be appreciated that when the marker and repeat mark have been set at a same location or closely adjoining locations of the performance data as above, at least one of the marker and repeat mark may be displayed at a location displaced from its originally-set location so that both of the marker and repeat mark can be displayed simultaneously without presenting inconveniences due to overlapping display. For example, the marker may be displayed displaced leftward or rightward (see other example in FIG. 12), in which case an indicator (in the illustrated example, a downwardly oriented triangle) pointing to the originally-set location may be displayed without being displaced from the originally-set location.

Further, the marker or repeat mark, for which the display filter has been turned OFF, may continue to be displayed slightly in a light color such that it does not interfere with the repeat mark or marker for which the display filter is being turned ON, rather than being caused to disappear completely.

Referring back to FIG. 7, it is determined at step S24 whether chord-name-related input (addition of a new chord name, change or deletion of the existing chord name or the like) has been made or not. If such chord-name-related input has been made (YES determination at step S24), the input chord name is transposed in accordance with the chord instrument type and then the thus-transposed chord name is written into the master track data (or the chord name is deleted if the input so indicates) at step S26. More specifically, if the user has input a chord of a transposing instrument via the track view window, the input chord is first changed to a chord name in the C major key and then the changed chord name is recorded as chord name data. If, on the other hand, no chord-name-related input has been made (NO determination at step S24), the input item setting/display process jumps to step S27. Note that in a situation where the master track data are arranged in such a way as to record chord name data corresponding to normal and transposing instruments, chord names for respective musical instruments can be recorded without the chord name having to be changed as above, and thus recording (or display) of the chord name can, of course, be effected without no chord name change. In such a case, however, it is also necessary to record which transposing instrument the recorded chord name is associated with. Then, at step S27, it is determined whether or not partial-repeat-mark-related input (addition of a new partial repeat mark, positional change or deletion of the existing partial repeat mark or the like) has been made via the staff window. If such partial-repeat-mark-related input has been made (YES determination at step S27), the input partial repeat mark is displayed on the staff window (or the partial repeat mark is deleted if the input so indicates) at step S28. Then, at step S29, the input partial repeat mark is written into the track data corresponding to the staff window (or the partial repeat mark is deleted if the input so indicates).

Figure 13:
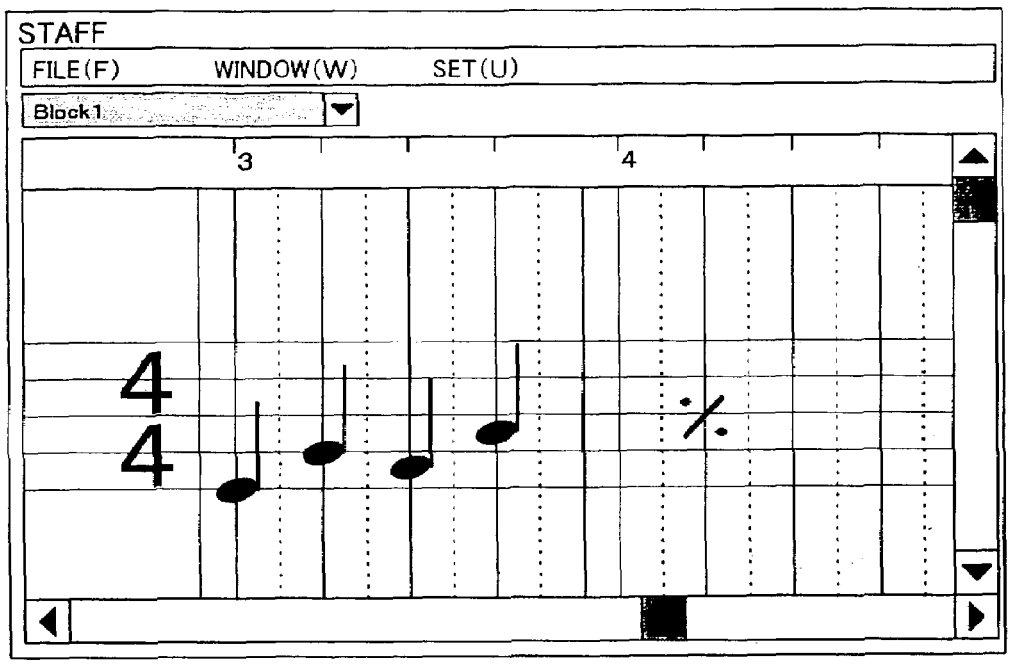
FIG. 13 is a diagram showing an example of a screen for inputting a partial repeat mark.
Figure 14A:
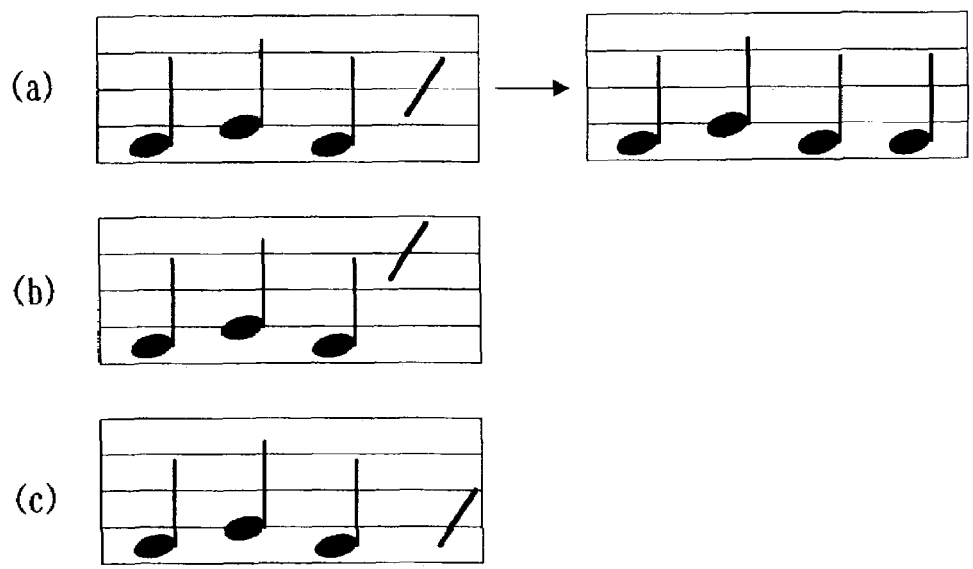
FIG. 14A is a diagram explanatory of a beat-repeating partial repeat mark.
Figure 14B:
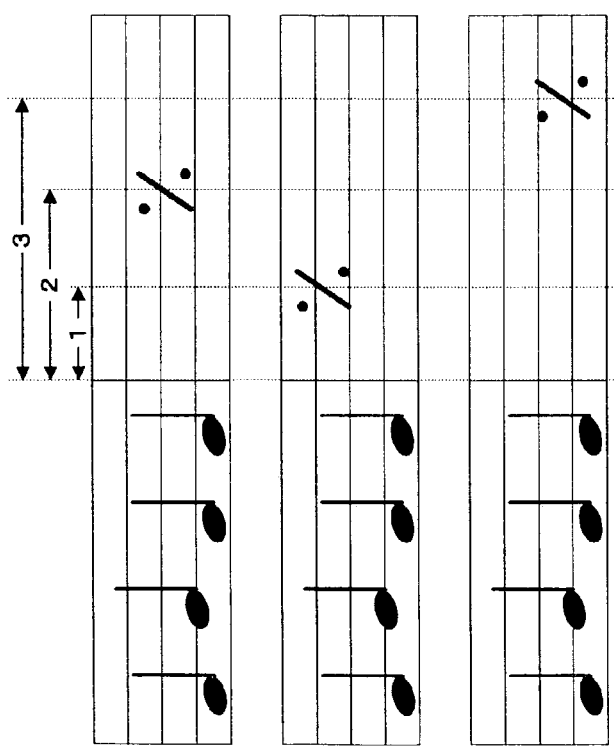
FIG. 14B is a diagram explanatory of a measure-repeating partial repeat mark.

The following paragraphs briefly describe the partial repeat mark. FIG. 13 is a conceptual diagram showing an example of a screen for inputting a partial repeat mark. FIGS. 14A and 14B are diagrams explanatory of an exemplary manner in which a partial repeat mark is input; specifically, FIG. 14A is explanatory of a beat-repeating partial repeat (i.e., a partial repeat mark for repeating a beat-constituting unit of the performance data) while FIG. 14B is explanatory of a measure-repeating partial repeat (i.e., a partial repeat mark for repeating a measure-constituting Unit of the performance data).

More specifically, the beat-repeating partial repeat mark is used for copying a beat-constituting note immediately preceding the location where the repeat mark has been input (see part (a) of FIG. 14A). Such a beat-repeating partial repeat mark can be appropriately accepted by the apparatus even when the user enters it to a location on the window slightly displaced horizontally or vertically from a predetermined location (see parts (b) and (c) of FIG. 14A). The measure partial repeat mark is used for copying notes of a measure immediately preceding the location where the repeat mark has been input (see part (a) of FIG. 14B). Such a measure-repeating partial repeat mark can also be appropriately accepted by the apparatus even when the user enters it to a location on the window slightly displaced horizontally or vertically from a predetermined location within the measure (see parts (b)and (c) of FIG. 14B). In this way, these partial repeat marks can be input to any user-desired locations on the window. Of course, creation and/or editing of the performance data can be performed by entering any desired notes or rests after these partial repeat marks. Further, another note may be newly entered into a same beat or same measure as the existing note or notes, in which case there is provide harmony of the existing (i.e., copied-from) note(s) and newly-entered other note(s).

Once the user inputs the partial repeat mark to the window, the partial repeat mark is recorded into the track data as shown in FIG. 2. As the partial repeat mark is recorded, timing data, which is used to determine a location on the window where the partial repeat mark is to be displayed, is also recorded into the track data. For example, the timing data of the partial repeat marks entered in the locations shown in parts (a), (b) and (c) of FIG. 14B are recorded in different manners; for example, assuming that the timing data in part (a) of FIG. 14B is recorded as a value "2", the timing data in parts (b) and (c) of FIG. 14B will be recorded as values "1" and "3", respectively. Then, the partial repeat marks are positioned and displayed at predetermined locations on the window which correspond to their timing data.

Figure 8:
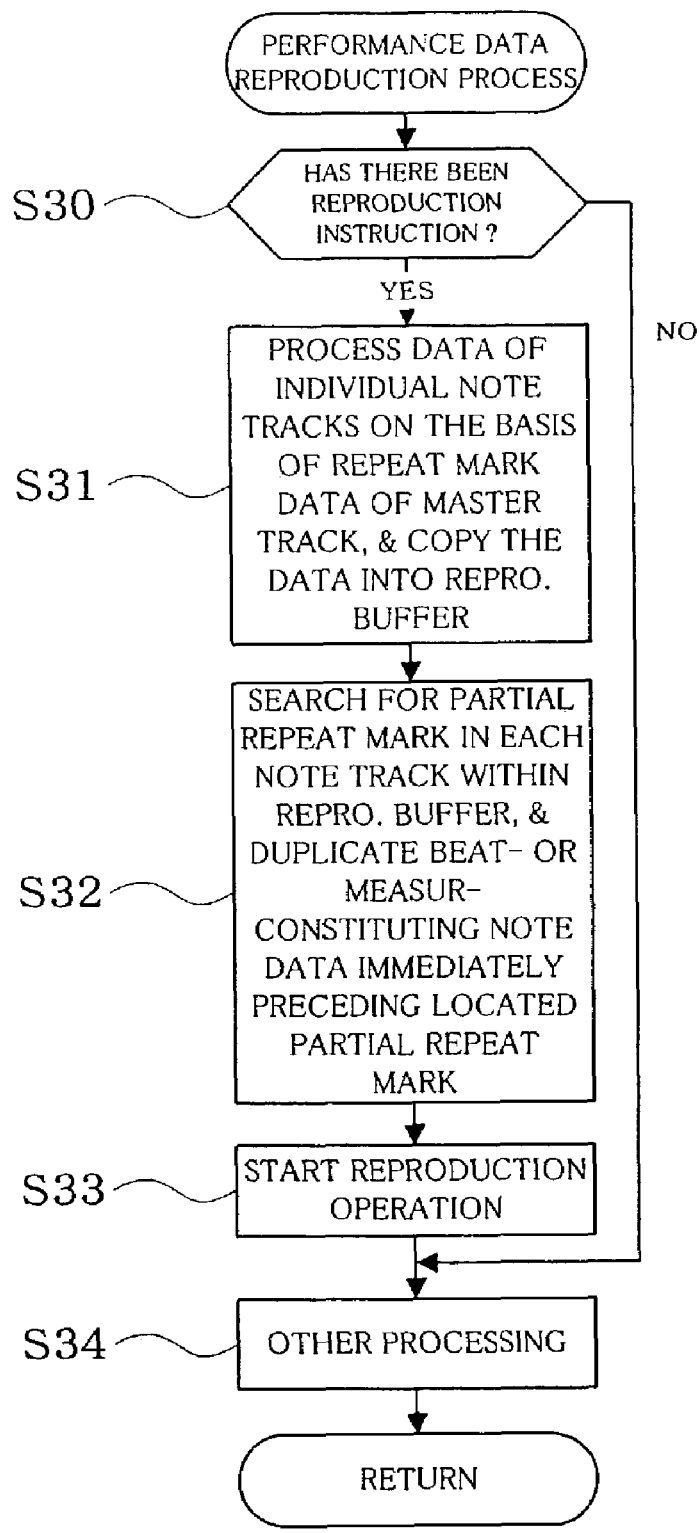
FIG. 8 is a flow chart showing an exemplary operational sequence of a performance data reproduction process shown in FIG. 4.

Finally, a description will be made about the performance data reproduction process at step S104 of FIG. 4, with reference to FIG. 8 showing an exemplary operational sequence of the performance data reproduction process. At step S30, a determination is made as to whether a reproduction instruction has been given or not. If no reproduction instruction has been given as determined at step S30, the performance data reproduction process jumps to step S34, If, however, such a reproduction instruction has been given (YES determination at step S30), the data of the individual note tracks are processed on the basis of the repeat mark data included in the master track data, i.e. data segments to be repeated are caused to repeat themselves in the master track data and copied into a reproduction buffer, at step S31. Then, a search is made for a partial repeat number in each of the note tracks within the reproduction buffer, and the beat-constituting or measure-constituting note data (depending on the type of the partial repeat mark) immediately preceding each of the thus-located partial repeat numbers are duplicated after the note data, at step S32. After that, a predetermined reproduction operation is started at step S33 so as to initiate a performance in accordance with the performance data. The reproduction operation of step S33 is executed every predetermined processing period, such as timer interrupt timing, which may or may not correspond to the currently-set performance tempo. Namely, the predetermined processing period may be varied in accordance with the currently-set performance tempo, the timing data values in automatic performance data may be varied in accordance with the currently-set performance tempo with the processing period kept constant, or the way of counting the timing data in the performance data may be varied in accordance with the currently-set performance tempo per execution of the process with the processing period kept constant. Anyway, the reproduction operation of step S33 may be executed at any desired timing; as an example, it may be executed at time intervals of 1/96 of the quarter note length. At step S34, other necessary processing is carried out.

Whereas the performance data reproduction process has been described as creating, in response to issuance of the reproduction instruction, note data reflecting the partial repeat mark, the note data reflecting the partial repeat mark may be created when the partial repeat mark has been input. In another alternative, the note data reflecting the partial repeat mark may be created when a performance data file is to be stored. Further, the note data reflecting the partial repeat mark may be displayed on the staff window, piano roll window or the like.

The electronic musical instrument for use with the present invention may be of any other type than the keyboard instrument, such as a stringed, wind or percussion instrument. Further, whereas the preferred embodiments have been described above in relation to the electronic musical instrument in which the tone generator device, automatic composition device, etc. are incorporated together within the body of a single electronic musical instrument, it should be obvious that the present invention is not so limited and can be applied to electronic musical instruments where the tone generator device, automatic composition device, etc. are separated from each other and connected via communication means such as a MIDI interface and communication network. Furthermore, the electronic musical instrument may be composed of a personal computer and software, in which case processing programs may be supplied from storage media, such as a magnetic disk, optical disk or semiconductor memory, or via a communication network. Moreover, the present invention may be applied to creation of performance data to be used in a karaoke apparatus, or to an automatic accompaniment apparatus.

In summary, the present invention is characterized by allowing a window of a user-desired form to be automatically opened by default. With this arrangement, the present invention can eliminate a need for separately making predetermined operations to open a window of a desired form and thereby readily perform editing of the performance data without requiring cumbersome operations.

The present invention is also characterized by reliably preventing a marker and a repeat mark from being displayed on a window in an overlapping relation to each other and displaying a chord name on a window in corresponding relation to a designated transposing instrument, with the result that the user is allowed to readily perform operations for creating/editing the performance data.

Further, the present invention is arranged to permit inputting of partial repeat marks and performance corresponding thereto, so that the user is allowed to enjoy creating an increased variety of musical expressions.

What is claimed is:

1. A music performance data processing method comprising the steps of:
   in accordance with an instruction by a user, graphically inserting a repeat mark in a desired performance location of a music score displayed on a screen on the basis of performance data stored in a storage device, said performance data being data to be used by a tone generator device to perform music; and
   copying a predetermined unit of the performance data immediately preceding said performance location, where the repeat mark has been inserted, in such a manner that the predetermined unit of the performance data is repeated in the performance data in accordance with the repeat mark, whereby the copied predetermined unit of the performance data is additionally written into the performance data stored in the storage device.

2. A music performance data processing method as claimed in claim 1 wherein said step of copying copies a beat-constituting unit of the performance data immediately preceding said performance location, where the repeat mark has been inserted, in such a manner that the beat-constituting unit of the performance data is repeated in the performance data in accordance with the repeat mark.

3. A music performance data processing method as claimed in claim 1 wherein said step of copying copies a measure-constituting unit of the performance data immediately preceding said performance location, where the repeat mark has been inserted, in such a manner that the measure-constituting unit of the performance data is repeated in the performance data in accordance with the repeat mark.

4. A music performance data processing method as claimed in claim 1 wherein a plurality of tracks are provided for storing performance data of a music piece and the plurality of tracks include one master track and a plurality of note tracks, and wherein the performance data are stored in the note tracks, control data common to the performance data stored in the note tracks are stored in the master track, and the repeat mark inserted by said step of inserting is stored in any of the note tracks.

5. A music performance data processing method as claimed in claim 1 wherein said step of inserting is capable of freely inserting the repeat mark to any desired position of the music score displayed on the screen, and
   said step of inserting includes a step of judging a proper performance location on the basis of the position of the repeat mark freely inserted.

6. A music performance data processing method as claimed in claim 1 wherein said step of copying converts the inserted repeat mark to same note data as the performance data immediately preceding said performance location.

7. A machine-readable storage medium containing a group of instructions to cause said machine to implement a music performance data processing method, said music performance data processing method comprising the steps of:
   in accordance with an instruction by a user, graphically inserting a repeat mark in a desired performance location of a music score displayed on a screen on the basis of performance data stored in a storage device, said performance data being data to be used by a tone generator device to perform music; and
   copying a predetermined unit of the performance data immediately preceding said performance location, where the repeat mark has been inserted, in such a manner that the predetermined unit of the performance data is repeated in the performance data in accordance with the repeat mark, whereby the copied predetermined unit of the performance data is additionally written into the performance data stored in the storage device.

8. A machine-readable storage medium as claimed in claim 7 wherein said step of copying copies a beat-constituting unit of the performance data immediately preceding said performance location, where the repeat mark has been inserted, in such a manner that the beat-constituting unit of the performance data is repeated in the performance data in accordance with repeat mark.

9. A machine-readable storage medium as claimed in claim 7 wherein said step of copying copies a measure-constituting unit of the performance data immediately preceding said performance location where the repeat mark has been inserted, in such a manner that the measure-constituting unit of the performance data is repeated in the performance data in accordance with the repeat mark.

10. A machine-readable storage medium as claimed in claim 7 wherein a plurality of tracks are provided for storing performance data of a music piece and the plurality of tracks include one master track and a plurality of note tracks, and wherein the performance data are stored in the note tracks, control data common to the performance data stored in the note tracks are stored in the master track, and the repeat mark inserted by said step of inserting is stored in any of the note tracks.

11. A machine-readable storage medium as claimed in claim 7 wherein said step of inserting is capable of freely inserting the repeat mark to any desired position of the music score displayed on the screen, and said step of inserting includes a step of judging a proper performance location on the basis of the position of the repeat mark freely inserted.

12. A machine-readable storage medium as claimed in claim 7 wherein said step of copying converts the inserted repeat mark to same note data as the performance data immediately preceding said performance location.

13. A music performance data processing apparatus comprising:

a display device adapted to show a music-performance-data display screen;

an input device adapted to input a repeat mark to a designated performance location of a music score displayed on the music-performance-data display screen on the basis of performance data stored in a storage device, said performance data being data to be used by a tone generator device to perform music; and a processor coupled with said display device and said input device, said processor being adapted to copy a predetermined unit of the performance data immediately preceding said performance location, where the repeat mark has been input, in such a manner that the predetermined unit of the performance data is repeated in the performance data in accordance with the repeat mark, whereby the copied predetermined unit of the performance data is additionally written into the performance data stored in the storage device.

14. A music performance data processing method comprising the steps of:

writing, into a storage device, performance data having a repeat mark inserted in a desired performance location thereof, in accordance with a reproduction instruction by a user;

copying a predetermined unit of the performance data immediately preceding said desired performance location, where the repeat mark has been inserted, in such a manner that the predetermined unit of the performance data is repeated in the performance data in accordance with the repeat mark, whereby the copied predetermined unit of the performance data is additionally written into the performance data stored in the storage device; and starting music reproduction on the basis of the performance data including the predetermined unit of the performance data stored in said storage device and copied by said step of copying.

15. A music performance data processing apparatus comprising:

a writing section that writes, into a storage device, performance data having a repeat mark inserted in a desired performance location thereof, in accordance with a reproduction instruction by a user;

a copying section that copies a predetermined unit of the performance data immediately preceding said desired performance location, where the repeat mark has been inserted, in such a manner that the predetermined unit of the performance data is repeated in the performance data in accordance with the repeat mark, whereby the copied predetermined unit of the performance data is additionally written into the performance data stored in the storage device; and a reproduction control section that starts music reproduction on the basis of the performance data including the predetermined unit of the performance data stored in said storage device and copied by said copying section.

16. A machine-readable storage medium containing a group of instructions to cause said machine to implement a music performance data processing method, said music performance data processing method comprising the steps of:

writing into a storage device, performance data having a repeat mark inserted in a desired performance location thereof, in accordance with a reproduction instruction by a user;

copying a predetermined unit of the performance data immediately preceding said desired performance location, where the repeat mark has been inserted, in such a manner that the predetermined unit of the performance data is repeated in the performance data in accordance with the repeat mark, whereby the copied predetermined unit of the performance data is additionally written into the performance data stored in the storage device; and starting music reproduction based on the performance data including the predetermined unit of the performance data stored in said storage device and copied by said step of copying.

* * * * *